United States Patent
Kang et al.

(10) Patent No.: US 10,595,020 B2
(45) Date of Patent: Mar. 17, 2020

(54) CONTENT PROVIDING APPARATUS, DISPLAY APPARATUS, AND CONTROL METHOD THEREFOR

(71) Applicant: SAMSUNG ELECTRONICS CO., LTD., Suwon-si, Gyeonggi-do (KR)

(72) Inventors: Woo-seok Kang, Suwon-si (KR); Bong-joe Kim, Seoul (KR); Se-hyeok Park, Seoul (KR); Jong-sul Min, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/528,272

(22) PCT Filed: Dec. 7, 2015

(86) PCT No.: PCT/KR2015/013324
§ 371 (c)(1),
(2) Date: May 19, 2017

(87) PCT Pub. No.: WO2016/104990
PCT Pub. Date: Jun. 30, 2016

(65) Prior Publication Data
US 2017/0339408 A1 Nov. 23, 2017

(30) Foreign Application Priority Data
Dec. 23, 2014 (KR) .......................... 10-2014-0187237

(51) Int. Cl.
*H04N 19/119* (2014.01)
*H04N 19/85* (2014.01)
(Continued)

(52) U.S. Cl.
CPC ............ *H04N 19/119* (2014.11); *G06T 5/001* (2013.01); *G06T 5/20* (2013.01); *G06T 7/11* (2017.01);
(Continued)

(58) Field of Classification Search
None
See application file for complete search history.

(56) References Cited

U.S. PATENT DOCUMENTS 8,498,482 B2    7/2013 Varekamp
2005/0117798 A1 6/2005 Patton et al.
(Continued)

FOREIGN PATENT DOCUMENTS

CN    102783132    11/2012
EP    2 187 350    5/2010
(Continued)

OTHER PUBLICATIONS

Extended Search Report dated Oct. 25, 2017 in counterpart European Patent Application No. 15873517.5.
(Continued)

*Primary Examiner* — Kim Y Vu
*Assistant Examiner* — Nathan J Bloom
(74) *Attorney, Agent, or Firm* — Nixon & Vanderhye, P.C.

(57) ABSTRACT

A content providing apparatus is disclosed. The content providing apparatus comprises: a communication unit for communicating with an external apparatus; an image processing unit for generating a compressed image by image-processing an input original image; and a control unit for controlling the communication unit to divide the original image into one or more regions based on the image quality, to obtain characteristic information for each region from the respective regions, and to transmit the obtained character-
(Continued)

istic information for each region together with the compressed image to the external apparatus. As the result, the display apparatus may perform image quality improvement operation so that the image quality is close to the original quality level by extracting information required for improving the image quality and transmitting the same together with a compressed image in production and encoding steps before transmitting the image.

12 Claims, 12 Drawing Sheets

(51) Int. Cl.
    *H04N 19/46*     (2014.01)
    *H04N 21/434*     (2011.01)
    *H04N 19/23*     (2014.01)
    *H04N 21/236*     (2011.01)
    *H04N 21/8405*     (2011.01)
    *G06T 5/00*     (2006.01)
    *G06T 7/90*     (2017.01)
    *G06T 7/11*     (2017.01)
    *G06T 5/20*     (2006.01)
    *H04N 19/17*     (2014.01)

(52) U.S. Cl.
    CPC ............... *G06T 7/90* (2017.01); *H04N 19/17* (2014.11); *H04N 19/23* (2014.11); *H04N 19/46* (2014.11); *H04N 19/85* (2014.11); *H04N 21/23614* (2013.01); *H04N 21/434* (2013.01); *H04N 21/8405* (2013.01); *G06T 2207/20021* (2013.01)

(56) References Cited

U.S. PATENT DOCUMENTS

| | | |
|---|---|---|
| 2011/0285813 A1 | 11/2011 | Girdzijauskas et al. |
| 2012/0033875 A1* | 2/2012 | Bergman ................. G06T 7/11 382/164 |
| 2012/0314129 A1 | 12/2012 | Mertens |
| 2013/0170555 A1 | 7/2013 | Zhang |
| 2014/0055497 A1 | 2/2014 | Sohn |
| 2014/0119432 A1* | 5/2014 | Wang ................... H04N 19/176 375/240.2 |
| 2014/0140632 A1 | 5/2014 | Song et al. |

FOREIGN PATENT DOCUMENTS

| | | |
|---|---|---|
| JP | 2006-279454 | 10/2006 |
| KR | 10-2009-0107907 | 10/2009 |
| KR | 10-1285811 | 7/2013 |
| KR | 10-1347956 | 1/2014 |
| WO | WO 2011/010834 | 1/2011 |
| WO | 2011/107905 | 9/2011 |
| WO | 2014/009844 | 1/2014 |
| WO | WO 2014/007450 | 1/2014 |

OTHER PUBLICATIONS

International Search Report for PCT/KR2015/013324, dated Mar. 16, 2016, 4 pages.
Written Opinion of the ISA for PCT/KR2015/013324, and English-language translation, dated Mar. 16, 2016, 10 pages.
Communication pursuant to Article 94(3) EPC dated Jun. 27, 2018 in counterpart European Patent Application No. 15873517.5.
Summons to attend oral proceedings pursuant to Rule 115(1) EPC dated Feb. 13, 2019 in counterpart European Patent Application No. 15873517.5.
Office Action dated Sep. 19, 2019 in counterpart Korean Patent Application No. 10-2014-0187237 and English-language translation.
Office Action dated Oct. 8, 2019 in counterpart Chinese Patent Application No. 201580070269.X and English-language translation.

* cited by examiner

CONTENT PROVIDING APPARATUS, DISPLAY APPARATUS, AND CONTROL METHOD THEREFOR

This application is the U.S. national phase of International Application No. PCT/KR2015/013324 filed 7 Dec. 2015, which designated the U.S. and claims priority to KR Patent Application No. 10-2014-0187237 filed 23 Dec. 2014, the entire contents of each of which are hereby incorporated by reference.

TECHNICAL FIELD

The present general inventive concept generally relates to a content providing apparatus, a display apparatus, and a method for controlling the same, and more particularly, to a content providing apparatus for performing an image quality improvement operation, a display apparatus, and a method for controlling the same.

BACKGROUND OF THE INVENTION

With the development of electronic technologies, various types of electronic apparatuses have been developed and have come into wide use. Particularly, various display apparatuses, such as, a television (TV), a mobile phone, a Personal Computer (PC), a laptop PC, a Personal Digital Assistant (PDA), or the like, are widely used in many households.

As the use of the display apparatuses has increased, there are growing user needs for more various functions. Accordingly, manufacturers have made greater efforts for satisfying the user needs, and products with new functions are being released one after another.

With the new functions, functions executed in a display apparatus are becoming more diverse. Particularly, the display apparatus may decode a received image, reconstruct the image, analyzes a characteristics of the reconstructed image, perform an image-processing operation, for example, noise reduction, an improvement operation of detail, contrast, and color, or gamma, and display the image.

However, such conventional processing method is performed based on supposition without information on an original image, thereby causing many differences as compared with the original image.

Further, the display apparatus does not receive any information on an image quality characteristic intended in a generating process of the image, and thus, may process the image quality according to a preset instruction of each display apparatus. Accordingly, the image may be distorted or emphasized excessively.

DETAILED DESCRIPTION OF THE INVENTION

Technical Purpose

The present disclosure has been provided to address the aforementioned and other problems and disadvantages occurring in the related art, and an aspect of the present disclosure provides a content providing apparatus that performs an image quality improvement operation by considering image quality of an original image, a display apparatus, and a method for controlling the same.

Means for Solving Problems

According to an embodiment of the present disclosure, there is provided a content providing apparatus. The content providing apparatus includes a communication unit configured to communicate with an external apparatus, an image processing unit configured to generate a compressed image by image-processing an inputted original image, and a control unit configured to divide the original image into one or more regions based on an image quality characteristic, obtain characteristic information for each region from the respective regions, and control the communication unit to transmit the obtained characteristic information for each region to the external apparatus together with the compressed image.

The control unit may divide the original image by pixels and divide the pixels into the one or more regions by grouping the pixels based on pixel information on the respective pixels.

The characteristic information for each region may include at least one of division information for each region for determining the respective divided regions, image quality information for each region on an image quality characteristic of the respective regions, boundary information for each region on distortion of image quality occurring at a boundary of the respective regions, intention information for each region on a predetermined image quality characteristic of the respective regions, and semantic information for each region for perceiving the respective regions.

The division information for each region may include information on a region to which the respective pixels of the original image belong among the respective divided regions. The information on the region to which the respective pixels of the original image belong may include at least one of information on a characteristic parameter for each region and information on a pixel coordinate of the respective regions.

The control unit may divide the compressed image into regions corresponding to the divided regions of the original image based on the image quality characteristic, obtain characteristics information for each region from the respective divided regions of the compressed image, and transmit the obtained characteristic information for each region of the compressed image.

The control unit may generate and transmit synchronization information for synchronization of the compressed image and the characteristic information for each region.

According to an embodiment of the present disclosure, there is provided a display apparatus. The a display apparatus includes a display unit, a receiving unit configured to receive characteristic information for each region of an original image and a compressed image of the original image, and a control unit configured to divide a plurality of pixels of the compressed image into one or more regions by grouping the pixels based on the characteristic information for each region, perform an image quality improvement operation for the respective divided regions, and control the display to display the improved image.

The characteristic information for each region may include at least one of division information for each region for determining the respective divided regions of the original image, image quality information for each region on an image quality characteristic of the respective regions of the original image, boundary information for each region on distortion of image quality occurring at a boundary of the respective regions of the original image, intention information for each region on a predetermined image quality characteristic of the respective regions of the original image, and semantic information for each region for perceiving the respective regions of the original image.

The control unit may determine to which region the plurality of respective pixels of the compressed image belong based on the division information for each region and perform the image quality improvement operation for the respective regions of the compressed image based on at least one of the image quality information for each region, the boundary information for each region, the intention information for each region, and the semantic information for each region.

The receiving unit may receive characteristic information for each region of the compressed image. The control unit may perform the image quality improvement operation for the compressed image based on the characteristic information for each region of the original image and the characteristic information for each region of the compressed image.

The receiving unit may receive synchronization information for synchronization of the compressed image and the characteristic information for each region. The control unit may perform the synchronization of the compressed image and the characteristic information for each region based on the synchronization information and perform the image quality improvement operation for the compressed image based on the characteristic information for each region.

According to an embodiment of the present disclosure, there is provided a method for controlling a content providing apparatus. The method includes generating a compressed image by image-processing an inputted original image, dividing the original image into one or more regions based on an image quality characteristic and obtaining characteristic information for each region from the respective regions, and transmitting the obtained characteristic information for each region to an external apparatus together with the compressed image.

The obtaining characteristic information for each region may include dividing the original image by pixels and dividing the pixels into the one or more regions by grouping the pixels based on pixel information on the respective pixels.

The characteristic information for each region may include at least one of division information for each region for determining the respective divided regions, image quality information for each region on an image quality characteristic of the respective regions, boundary information for each region on distortion of image quality occurring at a boundary of the respective regions, intention information for each region on a predetermined image quality characteristic of the respective regions, and semantic information for each region for perceiving the respective regions.

The division information for each region may include information on a region to which the respective pixels of the original image belong among the respective divided regions. The information on the region to which the respective pixels of the original image belong may include at least one of information on a characteristic parameter for each region and information on a pixel coordinate of the respective regions.

The obtaining characteristic information for each region may include dividing the compressed image into regions corresponding to the divided regions of the original image based on the image quality characteristic, obtaining characteristics information for each region from the respective divided regions of the compressed image, and transmitting the obtained characteristic information for each region of the compressed image.

The method may further include generating and transmitting synchronization information for synchronization of the compressed image and the characteristic information for each region.

According to an embodiment of the present disclosure, there is provided a method for controlling a display apparatus. The method includes receiving characteristic information for each region of an original image and a compressed image of the original image, dividing a plurality of pixels of the compressed image into one or more regions by grouping the pixels based on the characteristic information for each region and performing an image quality improvement operation for the respective divided regions, and displaying the improved image.

The characteristic information for each region may include at least one of division information for each region for determining the respective divided regions of the original image, image quality information for each region on an image quality characteristic of the respective regions of the original image, boundary information for each region on distortion of image quality occurring at a boundary of the respective regions of the original image, intention information for each region on a predetermined image quality characteristic of the respective regions of the original image, and semantic information for each region for recognizing the respective regions of the original image.

The performing the image quality improvement operation may include determining to which region the plurality of respective pixels of the compressed image belong based on the division information for each region and performing the image quality improvement operation for the respective regions of the compressed image based on at least one of the image quality information for each region, the boundary information for each region, the intention information for each region, and the semantic information for each region.

Effects of the Invention

According to the above-described various embodiments, the display apparatus may extract information necessary for image quality improvement while generating and encoding an image before transmission and transmit the extracted information along with a compressed image. Accordingly, the display apparatus may perform an image quality improvement operation closely to an original image.

DETAILED DESCRIPTION OF PREFERRED EMBODIMENT

Best Mode for Embodiments

Figure 1:
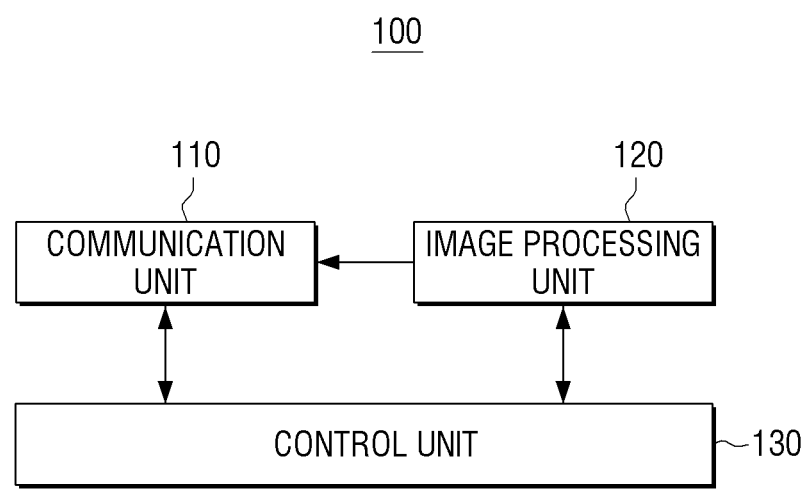
FIG. 1 is a block diagram illustrating a structure of a content providing apparatus according to an embodiment disclosed herein.

Certain embodiments are described below in greater detail with reference to the accompanying drawings. In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

FIG. 1 is a block diagram illustrating a structure of a content providing apparatus according to an embodiment disclosed herein.

Referring to FIG. 1, a content providing apparatus 100 includes a communication unit 110, an image processing unit 120, and a control unit 130. The content providing apparatus 100 may be realized as diverse types of electronic apparatuses, such as, a broadcasting transmitter, a set-top box, a TV, a desktop PC, a laptop PC, and so on.

The communication unit 110 may communicate with an external apparatus. In this case, the external apparatus refers to an apparatus that receives and displays an image and information on the image transmitted from content providing apparatus 100. A detailed description on the external apparatus will be provided below.

Particularly, the communication unit 110 may communicate with the external apparatus according to various communication methods, for example, wired and/or wireless Local Area Network (LAN), Wide Area Network (WAN), Ethernet, Bluetooth, Zigbee, Universal Serial Bus (USB), Institute of Electrical and Electronics Engineers (IEEE) 1394, Wireless-Fidelity (Wi-Fi), and so on. For doing this, the communication unit 110 may include a chip or an input port corresponding to each communication method. By way of example, the communication unit 150 may include a wired LAN card (not shown) and an input port (not shown) in order to perform the communication according to a wired LAN method.

The image processing unit 120 may generate a compressed image by image-processing an inputted original image. For instance, the original image may be inputted through the communication unit 110 or may be obtained from a storage medium, such as, a USB memory.

The control unit 130 may divide the original image into one or more regions based on an image quality characteristic, obtain characteristic information for each region from the respective regions, and control the communication unit 110 to transmit the obtained characteristic information for each region to the external apparatus along with the compressed image.

To be specific, the control unit 130 may divide the original image by pixels and dividing the pixels into one or more regions by grouping the pixels based on pixel information on the respective pixels. This operation will be described below in further detail with reference to FIG. 2.

Figure 2:
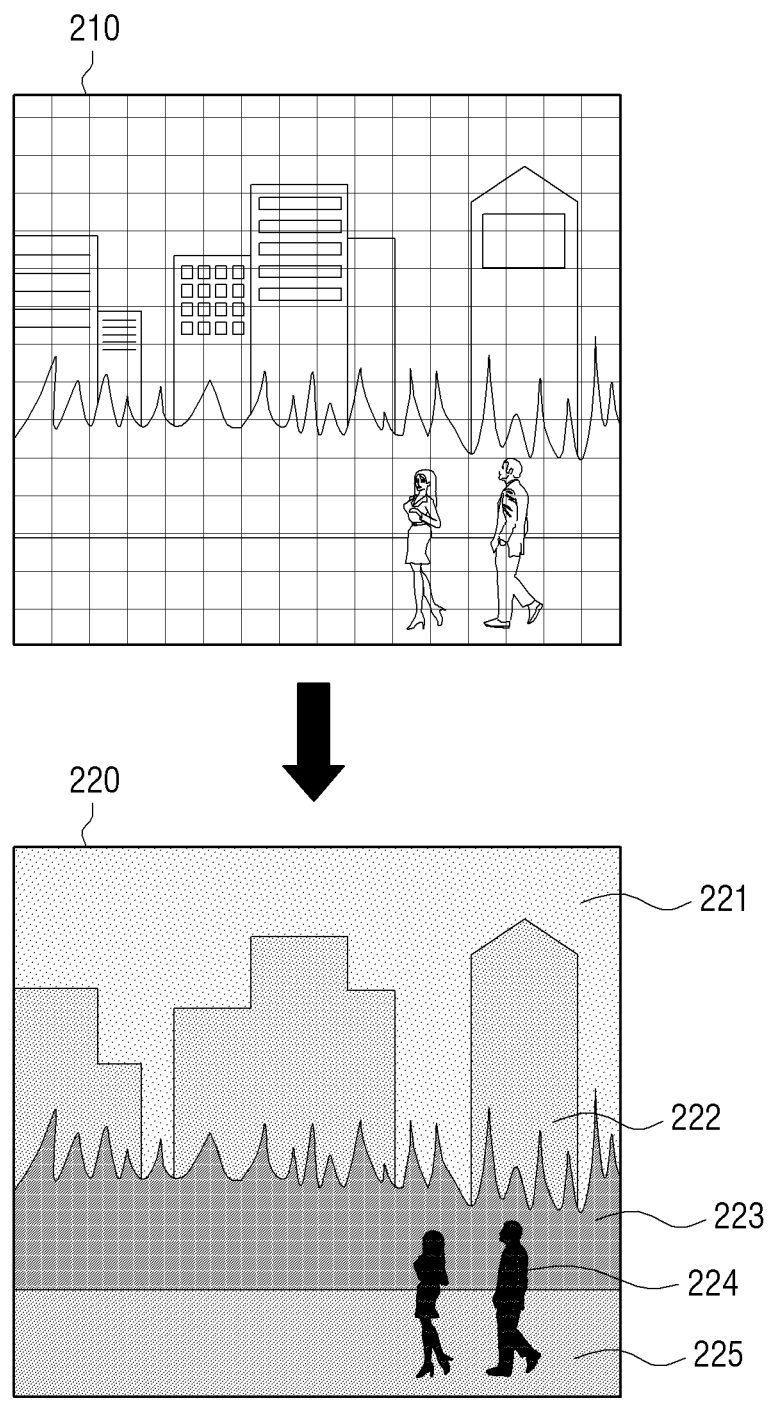
FIG. 2 is a diagram provided to describe division of regions according to an embodiment disclosed herein.

FIG. 2 is a diagram provided to describe division of regions according to an embodiment disclosed herein.

Referring to FIG. 2, an original image 210 may include a plurality of pixels. Further, the original image 210 may include various objects. By way of example, in FIG. 2, the original image 210 includes objects such as the sky, buildings, a lawn, the ground, and people.

The objects such as the sky, the buildings, the lawn, the ground, and the people have different image quality characteristics, respectively. For example, such object as the lawn does not need to be defined by a sharp boundary, and thus, has the image quality characteristic having fine detail information with relatively high frequency. By contrast, such objects as the building or the people need to be defined by a sharp boundary that a viewer is able to perceive, and thus, have the image quality characteristic having thick detail information with relatively low frequency.

Accordingly, the control unit 130 may divide the pixels of the original image 210 into one or more regions by grouping the pixels based on the pixel information on the respective pixels, that is, the image quality characteristic of the respective pixels.

By way of example, in FIG. 2, the pixels forming the lawn include color information in a tone of green and have the image quality characteristic having the fine detail information with the relatively high frequency similarly to each other. According to this distinctiveness, the control unit 130 may group the pixels into one region based on the similar color information and image quality characteristic. Further, the pixels forming the building include the color information in a tone of gray and have the image quality characteristic having the thick detail information with the relatively low frequency similarly to each other. According to this distinctiveness, the control unit 130 may group the pixels into one region based on the similar color information and image quality characteristic.

Accordingly, the control unit 130 may group the plurality of pixels of the original image 210 into one or more regions 221, 222, 223, 224, 225 based on the similar color information and image quality characteristic.

The lower drawing 220 of FIG. 2 illustrates an example where the respective pixels of the original image 210 are grouped into the plurality of regions 221, 222, 223, 224, 225 based on the pixel information on the respective pixels. Accordingly, the original image 210 may be displayed as the plurality of regions 221, 222, 223, 224, 225 having the different image quality characteristics.

In FIG. 2, the control unit 130 groups the plurality of pixels of the original image 210 into one or more regions based on the similar color information and image quality characteristic. However, a criterion for grouping the plurality of pixels into one or more regions is not limited thereto. Needless to say, the plurality of pixels may be grouped into one or more regions by various criteria.

Figure 3:
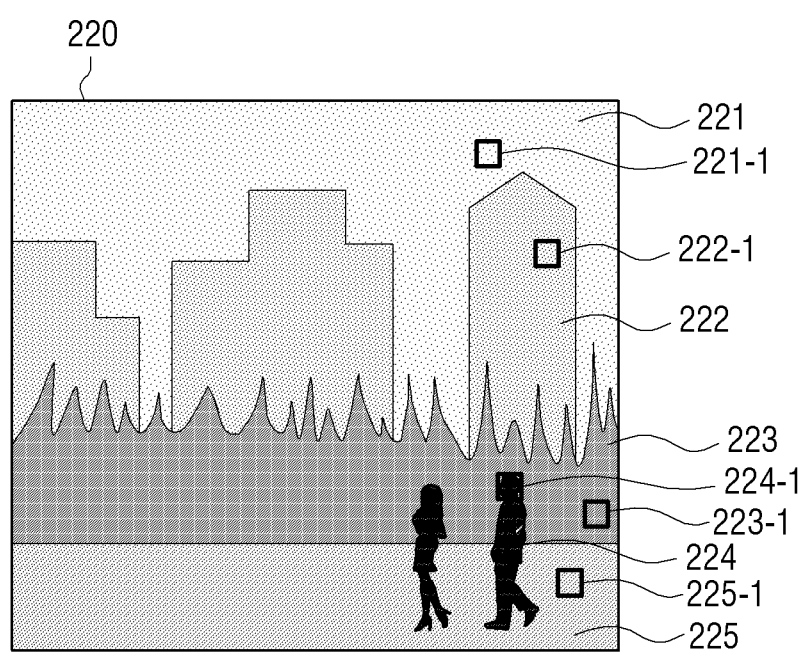
FIG. 3 is a diagram illustrating pixels of each region according to an embodiment disclosed herein.

FIG. 3 is a diagram illustrating pixels of each region according to an embodiment disclosed herein.

As described above in connection with FIG. 2, the control unit 130 may group the plurality of pixels of the original image 210 into one or more regions 221, 222, 223, 224, 225 based on the similar color information and image quality characteristic. In this case, the control unit 130 may transmit information on the pixels 222-1, 222-2, 223-1, 224-1, 225-1 of the respective regions 221, 222, 223, 224, 225 to the external apparatus such that the external apparatus may determine to which region the plurality of pixels belong. This operation will be described below in further detail.

The control unit 130 may obtain the characteristic information for each region from the respective regions 221, 222, 223, 224, 225.

In this case, the characteristic information for each region may include at least one of division information for each region for determining the respective divided regions, image quality information for each region on an image quality characteristic of the respective regions, boundary information for each region on distortion of image quality occurring at a boundary of the respective regions, intention information for each region on a predetermined image quality characteristic of the respective regions, and semantic information for each region for perceiving the respective regions.

In this case, the division information for each region may include information on a region to which the respective pixels of the original image belong among the respective divided regions. The division information for each region may be used as ground data for a receiving display apparatus to determine a region to which the respective pixels belong, at the least cost.

Particularly, the information on a region to which the respective pixels belong may include at least one of information on a characteristic parameter for each region and information on a pixel coordinate of the respective regions. For example, the information on a characteristic parameter for each region may include a statistical characteristic value such as a color centroid value or a color variance value of the pixels of the respective regions. The a pixel coordinate of the respective regions may include a geometrical characteristic value such as a boundary coordinate, a center coordinate, the largest region coordinate, and the smallest region coordinate of the respective regions.

To be specific, the information on a characteristic parameter for each region may relate to statistics of a color value and color variation of the pixels of the respective regions. The receiving display apparatus may compare the statistics of the color value and color variation of the respective pixels of the original image and determine that the pixels having the similar statistics belong to the same region, thereby determining to which region the respective pixels belong.

The information on a pixel coordinate of the respective regions may include a coordinate of the pixels forming a boundary of the respective regions, a coordinate of the pixels forming a center part of the respective regions, a coordinate of the pixels forming the largest region, a coordinate of the pixels forming the smallest region, or the like. The receiving display apparatus may determine to which region the respective pixels belong based on the coordinates of the pixels.

Further, the division information for each region may include a time-based characteristic value such as extinction of a region or a generation flag. The characteristic value may be used to maintain uniformity of the image quality of the respective regions in the receiving display apparatus.

Referring to FIG. 3, a centroid value and a variance value of a pixel 221-1 forming a region corresponding to an object 221 such as the sky mainly indicate a blue color. A centroid value and a variance value of a pixel 222-1 forming a region corresponding to an object 222 such as the building mainly indicate a gray color. A centroid value and a variance value of a pixel 223-1 forming a region corresponding to an object 223 such as the lawn mainly indicate a green color. A centroid value and a variance value of a pixel 224-1 forming a region corresponding to an object 2214 such as the people mainly indicate an apricot color. Further, a centroid value and a variance value of a pixel 225-1 forming a region corresponding to an object 225 such as the ground mainly indicate a brown color.

As described above, the control unit 130 may transmit the centroid values and the variance values of the pixels forming the regions 221, 222, 223, 224, 225 respectively corresponding to the objects of the sky, buildings, lawn, people, and the ground to the receiving display apparatus. Accordingly, the receiving display apparatus may determine to which region the respective pixels belong among the regions 221, 222, 223, 224, 225 respectively corresponding to the objects of the sky, buildings, lawn, people, and the ground based on the received centroid values and variance values of the pixels.

The control unit 130 may transmit the information indicating that the coordinate value of the pixel 221-1 forming the region 221 corresponding to the object of the sky is (20, 50), the coordinate value of the pixel 222-1 forming the region 222 corresponding to the object of the building is (25, 40), the coordinate value of the pixel 223-1 the region 223 corresponding to the object of the lawn is (30, 20), the coordinate value of the pixel 224-1 the region 224 corresponding to the object of the people is (20, 25), the coordinate value of the pixel 225-1 the region 225 corresponding to the object of the ground is (27, 10) to the receiving display apparatus directly. Accordingly, the receiving display apparatus may determine an accurate location and a region of the pixels 221-1, 222-1, 223-1, 224-1, 225-1.

Further, the image quality information for each region may relate to the image quality characteristic of each region. The image quality information on the respective regions. The image quality information for each region may include at least one of Noise information on a level of Random Noise for each region and a generated location and a size of Blocking Artifact, Detail information on a magnitude of level-based Frequency for each region and Textureness, Gradient Profile information for each region for applying Super Resolution for restoration of an Edge characteristic, Texture Database Index information for each region for applying Example-based Super Resolution for restoration of Texture, Flicker information on a degree of Temporal Flickering for each region, Motion information on an average Motion Vector for each region and motion uniformity, and Depth information on an average Depth for each region and an average Depth Vector.

The Noise information on a level of Random Noise for each region and a generated location and a size of Blocking Artifact may be ground data for performing Noise Reduction that is suitable for a Noise characteristic for each region. By way of example, the region 221 corresponding to the object such as the sky should not have many Noises, and thus, it is required to reduce the Noises more intensively. The region 223 corresponding to the object such as the lawn may have some Noises, and thus, the Noise reduction may be performed less intensively. That is, the Noise information for each region may include the ground data that facilitates Noise Reduction suitable for the Noise characteristic of each region.

The Detail information may enable the receiving display apparatus to perform detail enhancement suitable for a Frequency characteristic for each region. The Gradient Profile information may be used to restore an original Edge characteristic for each region in the receiving display apparatus through application of Gradient-based Super Resolution. The Texture Database Index may enable the receiving display apparatus to selectively refer to a predefined Texture Database thereby facilitating restoration of original Texture for each region through application of Example-based Super Resolution.

The Flicker information may enable the receiving display apparatus to selectively remove only a region where a Temporal Flicker exists. The Motion information may enhance accuracy of Motion Estimation in the receiving display apparatus. The Depth information may enhance a three-dimensional effect through automatic Contrast/Detail enhancement according to a depth in the receiving display apparatus.

The boundary information for each region may relate to the distortion of image quality occurring at a boundary of the respective regions. The boundary information for each region may include at least one of information on a size of Halo generated at the boundary of the respective regions, information on a size of Contour generated at the boundary of the respective regions, and information on a size of Ringing/Mosquito Artifact generated at the boundary of the respective regions.

In this case, the boundary information for each region may be the ground data for flexibly removing the Artifact generated at the boundary of the regions according to a type and size of the Artifact.

The intention information for each region may relate to a predetermined image quality characteristic of each region that a maker of the original image intended. For example, in FIG. 2, when the maker inserted an out-of-focus effect and a blurring effect into the region 223 corresponding to the object of the lawn and processed the region 224 corresponding to the object of the people to be relatively clear, the receiving display apparatus is unable to determine the maker's idea clearly. Accordingly, the receiving display apparatus may perform an image quality improvement operation of reducing all of the Noise and enhancing Detail with respect to both of the region 223 corresponding to the object of the lawn and the region 224 corresponding to the object of the people. As the result, the receiving display apparatus may output an image that is different from the maker's intention.

The image quality characteristic reflecting the maker's intention needs to be maintained without change. Accordingly, the control unit 130 may set the image quality characteristic reflecting the maker's intention as a predetermined image quality characteristic so as to be maintained.

To be specific, the intention information for each region may include at least one of information on an optimal/minimum/maximum brightness value of each region, information on visual Saliency of each region, information on Outfocus Level of each region, and information on a type and level of Noise specially intended and inserted in each region, and information on a particular Color Hue value specially intended in each region.

The information on the optimal/minimum/maximum brightness value of each region may be used to avoid excessive Enhance. The information on the visual Saliency of each region may be used to apply different emphasizing processes for each region depending upon the visual Saliency of each region. The information on the Outfocus Level of each region may be used to maintain a predetermined Outfocus region. In the same manner, the information on the type and level of Noise specially intended and inserted in each region and the particular Color Hue value specially intended in each region may be used to maintain an intended color and Noise for each region.

The semantic information for each region may be information for perception of each region and refer to information on a perceptive meaning of each region. As in FIG. 2, the semantic information for each region may include an object perception value of the objects such as the sky, the buildings, the lawn, the ground, and the people.

The information on the perceptive meaning of each region may be the ground data for the apparatus to perform an operation specialized for a region determined as having a particular meaning.

The characteristic information for each region may include the division information for each region as an essential element and may include the image quality information for each region, the boundary information for each region, the intention information for each region, and the semantic information for each region as selective elements.

As described above, the control unit 130 may control the communication unit 110 to transmit the obtained characteristic information for each region to the external apparatus along with the compressed image.

The control unit 130 may divide the compressed image into regions corresponding to the divided regions of the original image based on the image quality characteristic. Subsequently, the control unit 130 may obtain the characteristic information for each region of the compressed image from the respective divided regions of the compressed image and transmit the obtained characteristic information for each region of the compressed image.

To be specific, the control unit 130 may transmit the characteristic information for each region obtained from the respective regions of the original image, the characteristic information for each region obtained from the respective regions of the compressed image, and the compressed image to the external apparatus.

By way of example, when the receiving display apparatus has a processor with small throughput like a mobile terminal apparatus or needs to perform an operation quickly without delay, the receiving display apparatus may obtain the characteristic information for each region of the compressed image in advance from the content providing apparatus and transmit the obtained characteristic information for each region to a mobile terminal apparatus. Consequently, the mobile terminal apparatus may perform the image quality improvement operation immediately based on the received characteristic information for each region of the compressed image without obtaining the characteristic for each region of the compressed image based on the characteristic information for each region of the original image and the compressed image and performing the image quality improvement operation based on the obtained characteristic for each region of the compressed image.

In this case, the control unit 130 may obtain the characteristic information for each region of the compressed image from the respective divided regions of the compressed image. The characteristic information for each region of the compressed image may include the division information for each region which includes at least one of, a statistical characteristic value such as a color centroid value and a color variance value of the pixels of the respective regions, a geometrical characteristic value such as a boundary coordinate, a center coordinate, the largest region coordinate, and the smallest region coordinate the respective regions, and a time-based characteristic value such as extinction of a region, a generation flag, or the like.

The characteristic information for each region of the compressed image may include the image quality information for each region which includes at least one of the Noise information on a level of Random Noise for each region and a generated location and a size of Blocking Artifact, the Detail information on a magnitude of level-based Frequency for each region and Textureness, and the Flicker information on a degree of Temporal Flickering for each region.

The characteristic information for each region of the compressed image may include the boundary information for each region which includes at least one of the information on a size of Halo generated at the boundary of the respective regions, the information on a size of Contour generated at the boundary of the respective regions, and the information on a size of Ringing/Mosquito Artifact generated at the boundary of the respective regions.

Further, the control unit 130 may generate and transmit the synchronization information for synchronization of the compressed image and the characteristic information for each region. Accordingly, the receiving display apparatus may perform the synchronization of the received compressed image and the characteristic information for each region and perform the image quality improvement operation for the compressed image based on the characteristic information for each region.

Figure 4:
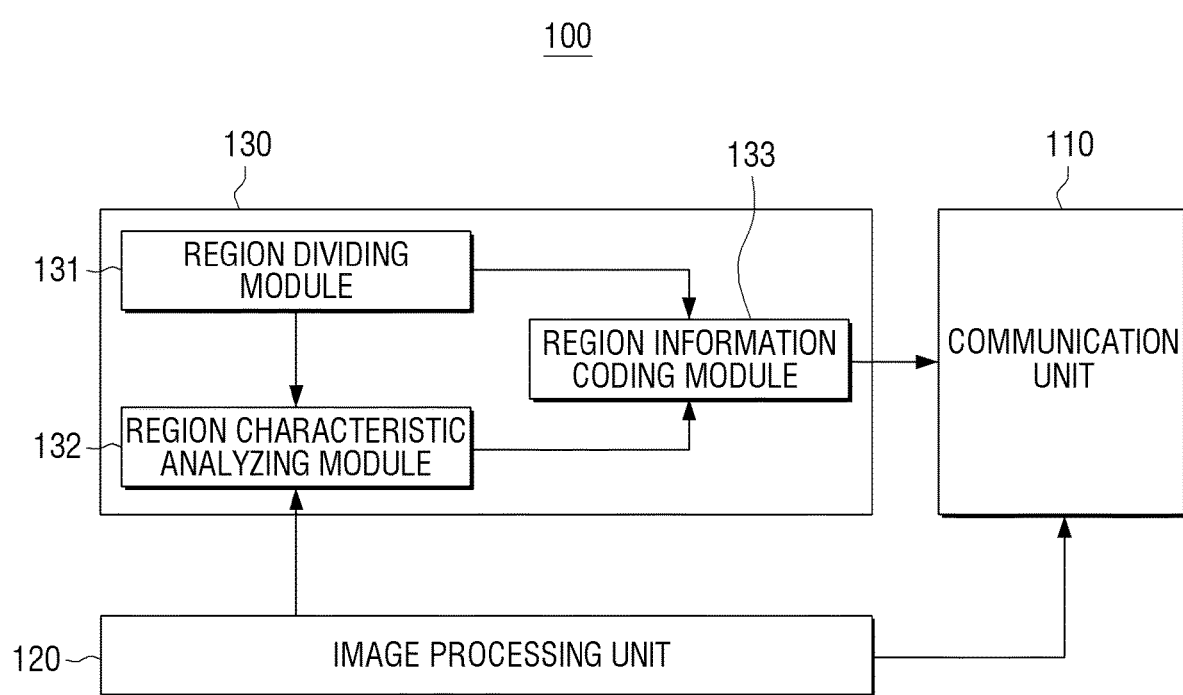
FIG. 4 is a block diagram illustrating a detailed structure of a content providing apparatus according to an embodiment disclosed herein.

FIG. 4 is a block diagram illustrating a detailed structure of a content providing apparatus according to an embodiment disclosed herein.

Referring to FIG. 4, the control unit 130 of the content providing apparatus 100 includes a region dividing module 131, a region character analyzing module 132, and a region information coding module 133.

In this case, the region dividing module 131 may obtain the division information for each region from one or more divided regions of the original image. The obtained division information for each region may be the ground data for a region determining module of the receiving display apparatus to determine to which region the respective pixels belong. A detailed description on the region determining module will be provided below.

To be specific, the region dividing module 131 may perform an operation of building a probability model for dividing regions by analyzing pixels and structure information of an image and an operation of dividing the image into one or more regions using the probability model.

The region character analyzing module 132 may integrate the characteristic information for each region of the original image and the intention information for each region inputted from an external source by using the division information for each region.

The region information coding module 133 may perform coding by integrating the division information for each region obtained from the region dividing module 131 and other characteristic information for each region (the image quality information for each region, the boundary information for each region, and the intention information for each region, and the semantic information for each region).

Figure 5:
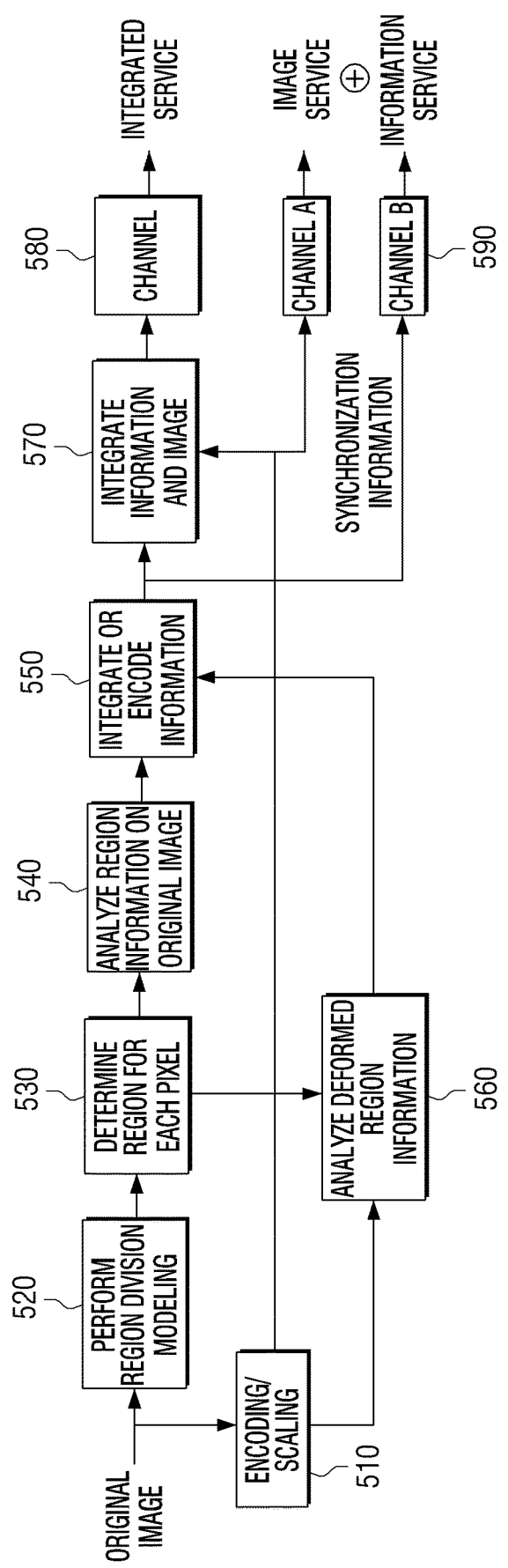
FIG. 5 is a diagram provided to describe a specific processing operation of a content providing apparatus according to an embodiment disclosed herein.

FIG. 5 is a diagram provided to describe a specific processing operation of a content providing apparatus according to an embodiment disclosed herein.

Referring to FIG. 5, in response to an original image being inputted to the content providing apparatus 100, the image processing unit 120 may generate a compressed image by performing encoding or scaling. The control unit 130 may perform operations of region division modeling 520, determining a region for each pixel 530, and analyzing region information on the original image 540.

The control unit 130 may selectively perform an operation of analyzing deformed region information 560 with respect to a compressed image. Subsequently, the control unit 130 may perform encoding 550 by integrating the analyzed region information of the original image and the deformed region information analyzed with respect to the compressed image.

The control unit 130 may perform an operation of integrating region information on the original image or the compressed image with the compressed image 570. Subsequently, the control unit 130 may transmit the integrated information and image through single transmission channel 580 or transmit the compressed image and the region information separately through a plurality of transmission channels A and B 590. In this case, the control unit 130 may transmit the synchronization information for synchronization of the compressed image and the region information together.

Figure 6:
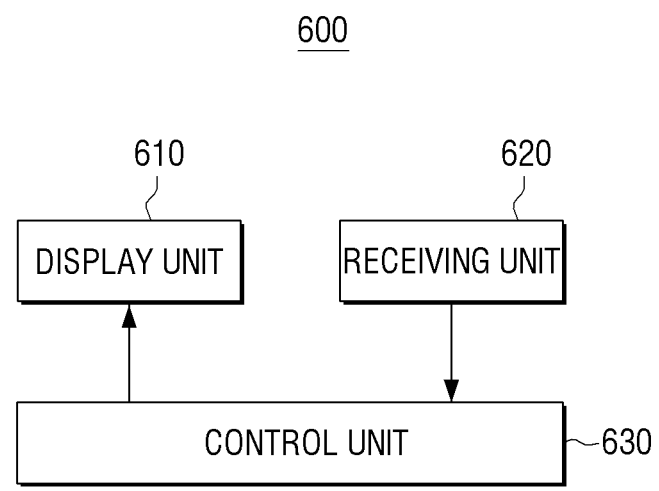
FIG. 6 is a block diagram illustrating a structure of a display apparatus according to an embodiment disclosed herein.

FIG. 6 is a block diagram illustrating a structure of a display apparatus according to an embodiment disclosed herein.

Referring to FIG. 6, a display apparatus 600 includes a display unit 610, a receiving unit 620, and a control unit 630.

The display unit 610 may display an image. The display unit 610 may be realized as Liquid Crystal Display (LCD), Organic Light-Emitting Diode (OLED), Plasma Display Panel (PDP), or the like.

The receiving unit 620 may receive characteristic information for each region of an original image and a compressed image of the original image.

The control unit 630 may divide a plurality of pixels of the compressed image into one or more regions by grouping the pixels based on the characteristic information for each region, perform the image quality improvement operation for the respective divided regions, and control the display unit 610 to display the improved image.

In this case, the characteristic information for each region may include at least one of division information for each region for determining the respective divided regions of the original image, image quality information for each region on an image quality characteristic of the respective regions of the original image, boundary information for each region on distortion of image quality occurring at a boundary of the respective regions of the original image, intention information for each region on a predetermined image quality characteristic of the respective regions of the original image, and semantic information for each region for perceiving the respective regions of the original image.

Further, the control unit 630 may determine to which region the respective pixels of the compressed image belong based on the division information for each region. The control unit 630 may perform the image quality improvement operation for each region of the compressed image based on at least one of the image quality information for each region, the boundary information for each region, the intention information for each region, and the semantic information for each region. The structure of the control unit 630 will be described below in further detail with reference to FIG. 7.

Figure 7:
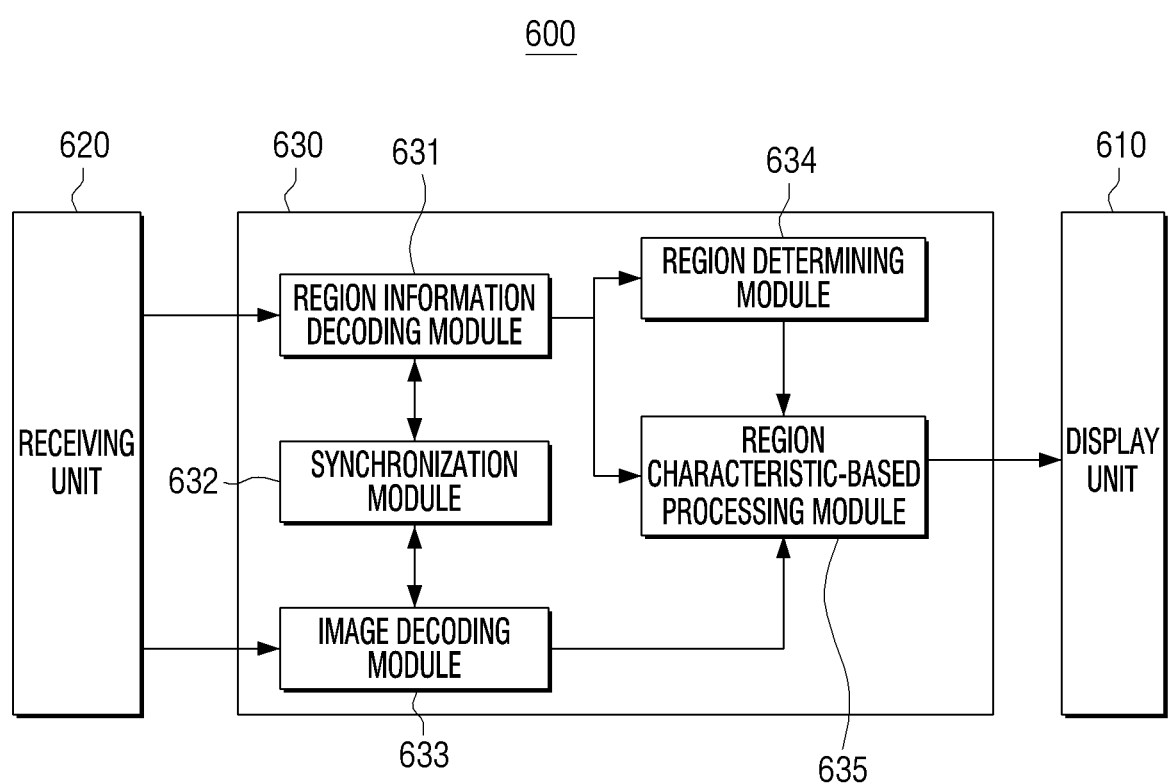
FIG. 7 is a diagram illustrating a detailed structure of a control unit 630 according to an embodiment disclosed herein.

FIG. 7 is a diagram illustrating a detailed structure of a control unit 630 according to an embodiment disclosed herein.

Referring to FIG. 7, the control unit 630 includes a region information decoding module 631, a synchronizing module 632, am image decoding module 633, a region determining module 634, and a region characteristic-based processing module 635.

The region information decoding module 631 may decode the received region information. The image decoding module 633 may decode the received image. The synchronizing module 632 may perform synchronization of the region information and an image frame.

The region determining module 634 may determine to which region the respective pixels of the compressed image belong based on the division information for each region. The region characteristic-based processing module 635 may perform the image quality improvement operation based on at least one of the image quality information for each region, the boundary information for each region, the intention information for each region, and the semantic information for each region included in the received the characteristic information for each region.

For example, as illustrated in FIG. 3, the region determining module 634 may determine to which region e the respective pixels 221-1, 222-1, 223-1, 224-1, 225-1 belong among the plurality of regions 221, 222, 223, 224, 225. The region characteristic-based processing module 635 may perform the image quality improvement operation differently for each region based on at least one of the image quality information for each region, the boundary information for each region, the intention information for each region, and the semantic information for each region included in the received characteristic information for each region.

Figure 8:
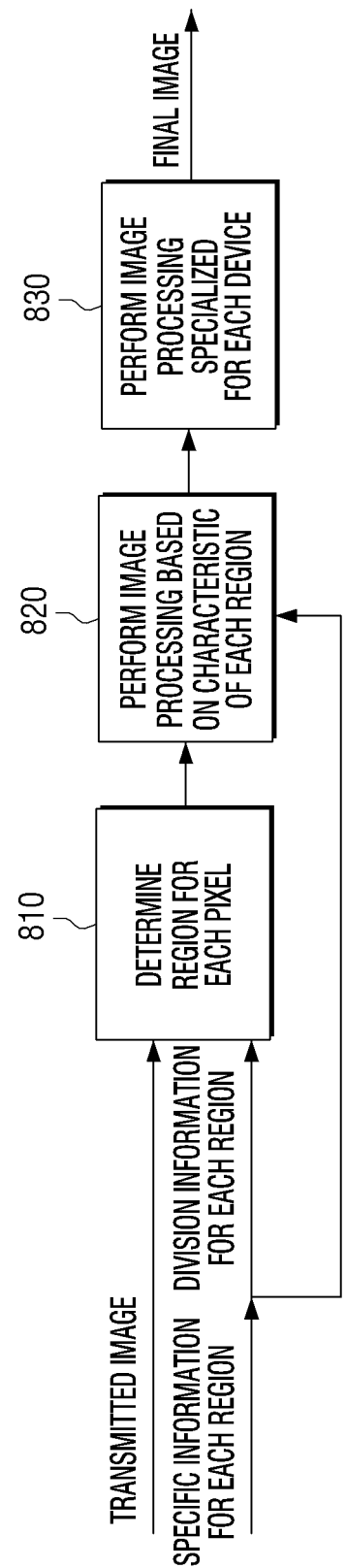
FIG. 8 is a diagram provided to describe a processing operation of a display apparatus according to an embodiment disclosed herein.

FIG. 8 is a diagram provided to describe a processing operation of a display apparatus according to an embodiment disclosed herein.

Referring to FIG. 8, the receiving unit 620 of the display apparatus 100 may receive an image and the characteristic information for each region. The control unit 630 may perform operations of determining a region for each pixel 810 based on the division information for each region out of the characteristic information for each region and perform region characteristic-based image processing 820 based on at least one of the image quality information for each region, the boundary information for each region, the intention information for each region, and the semantic information for each region included in the received the characteristic information for each region. Further, the control unit 630 may perform image processing specialized for each device 830 and generate a final output image.

The receiving unit 620 of the display apparatus 600 according to an embodiment disclosed herein may receive the characteristic information for each region of the compressed image. The control unit 630 may perform the image quality improvement operation for the compressed image based on the characteristic information for each region of the original image and the characteristic information for each region of the compressed image.

That is, as described above, in case of the display apparatus realized as a mobile terminal apparatus, in response to the characteristic information for each region of the compressed image being obtained in advance from the content providing apparatus 100 and transmitted to the display apparatus 600, the control unit 630 of the display apparatus 600 may perform the image quality improvement operation for the compressed image immediately without obtaining the characteristic information for each region of the compressed image based on the characteristic information for each region of the original image and the characteristic information for each region of the compressed image.

Further, the receiving unit 620 may receive the synchronization information for synchronization of the compressed image and the characteristic information for each region. The control unit 630 may perform the synchronization of the compressed image and the characteristic information for each region based on the synchronization information and perform the image quality improvement operation for the compressed image based on the characteristic information for each region.

Figure 9:
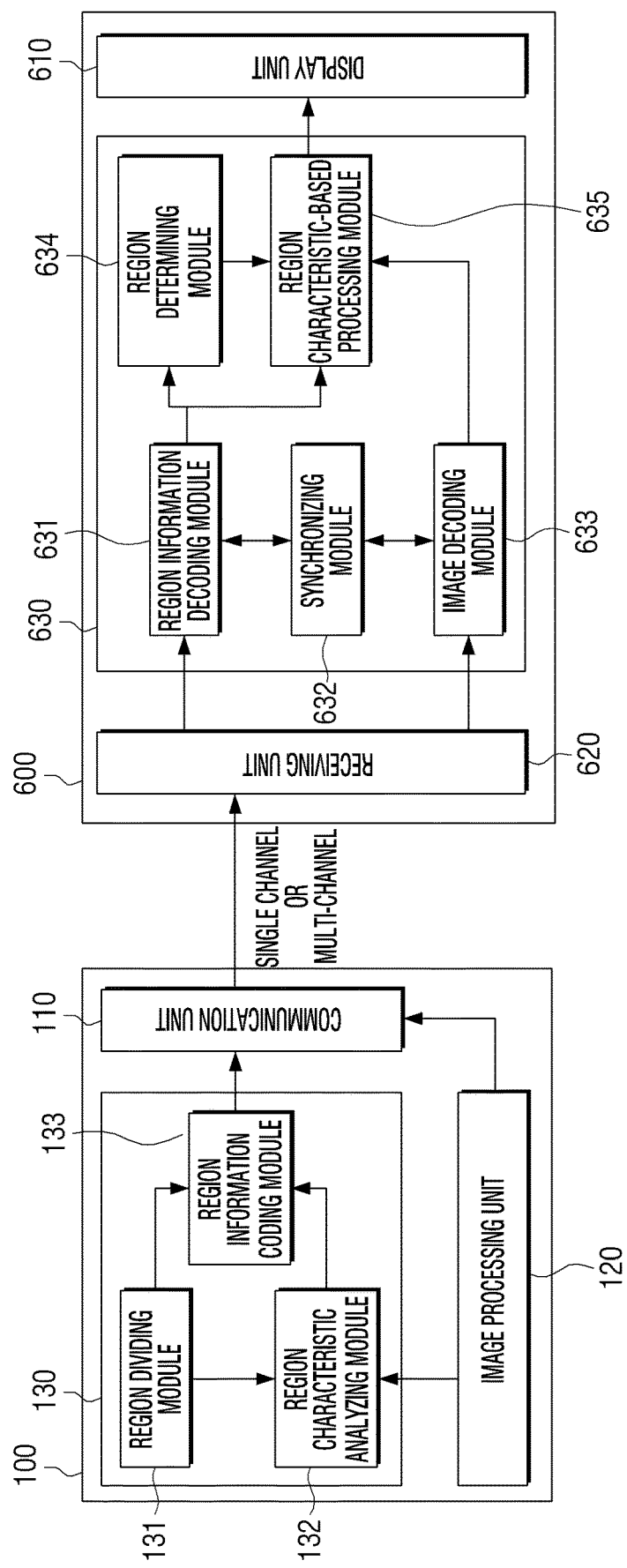
FIG. 9 is a diagram illustrating a structure of a system for an image quality improvement operation according to an embodiment disclosed herein.

FIG. 9 is a diagram illustrating a structure of a system for an image quality improvement operation according to an embodiment disclosed herein.

Referring to FIG. 9, a system for an image quality improvement operation includes the content providing apparatus 100 and the display apparatus 600. The content providing apparatus 100 may be connected with the display apparatus 600 through single channel or multi-channel.

The specific structures of the content providing apparatus 100 and the display apparatus 600 were described above, and thus, a repeated description will be omitted.

Figure 10:
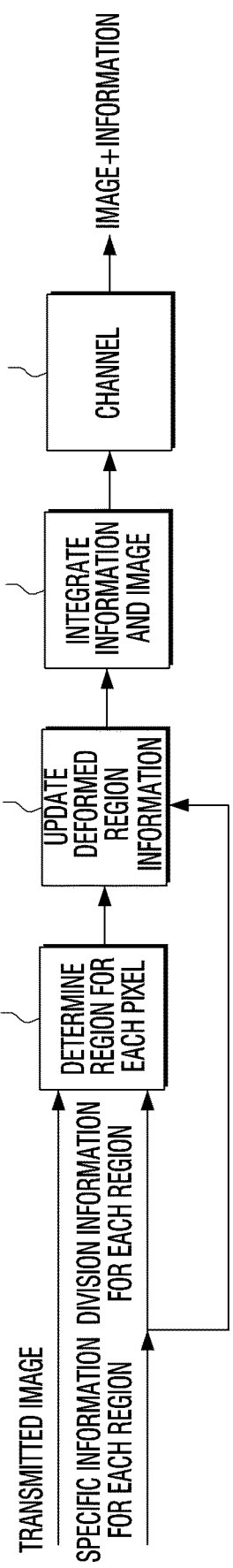
FIG. 10 is a diagram provided to describe an operation performed in an intermediate transmission phase according to an embodiment disclosed herein.

FIG. 10 is a diagram provided to describe an operation performed in an intermediate transmission phase according to an embodiment disclosed herein.

To be specific, in response to retransmission being performed by the third service provider in an intermediate transmission phase, the characteristic of an image may be changed again through transcoding, scaling, network balancing, or the like.

In this case, the deformed region information extracted from the content providing apparatus 100 may be updated to new information. Particularly, operations of determining a region for each pixel based on the division information for each region 1010, updating the deformed region information by reflecting the changed characteristic of the image 1020, integrating the updated information with the image 1030, and transmitting the information and the image through the channel 1040 may be performed by the third service provider.

The display apparatus 600 may receive all of the information on the characteristic of the image changed in the intermediate transmission phase. Accordingly, the display apparatus 600 may perform the image quality improvement operation more precisely.

Figure 11:
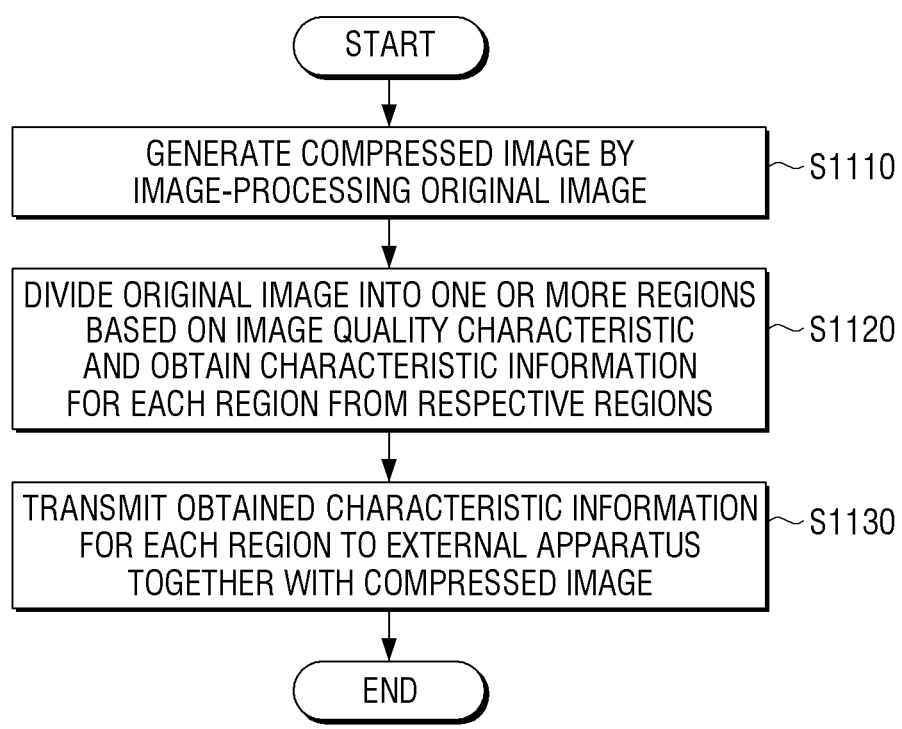
FIG. 11 is a flow chart provided to describe a method for controlling a content providing apparatus according to an embodiment disclosed herein.

FIG. 11 is a flow chart provided to describe a method for controlling a content providing apparatus according to an embodiment disclosed herein.

Referring to the method of FIG. 11, a compressed image may be generated by image-processing an original image (S1110).

The original image may be divided into one or more regions based on the image quality characteristic, and characteristic information for each region may be obtained from the respective regions (S1120).

In this case, the obtaining operation may include dividing the original image by pixels and grouping the pixels into one or more regions based on pixel information of the respective pixels.

The characteristic information for each region may include at least one of division information for each region for determining the respective divided regions, image quality information for each region on an image quality characteristic of the respective regions, boundary information for each region on distortion of image quality occurring at a boundary of the respective regions, intention information for each region on a predetermined image quality characteristic of the respective regions, and semantic information for each region for perceiving the respective regions.

The division information for each region may include information on a region to which the respective pixels of the original image belong among the respective divided regions. The information on the region to which the respective pixels of the original image belong may include at least one of information on a characteristic parameter for each region and information on a pixel coordinate of the respective regions.

The obtained characteristic information for each region may be transmitted to an external apparatus together with the compressed image (S1130).

In this case, the obtaining operation may include dividing the compressed image into regions corresponding to the divided regions of the original image based on the image quality characteristic and obtaining the characteristic information for each region of the compressed image from the respective divided regions of the compressed image. The transmitting operation may include transmitting the obtained characteristic information for each region of the compressed image.

The method for controlling a content providing apparatus according to an embodiment disclosed herein may further include generating and transmitting synchronization information for synchronization of the compressed image and the characteristic information for each region.

Figure 12:
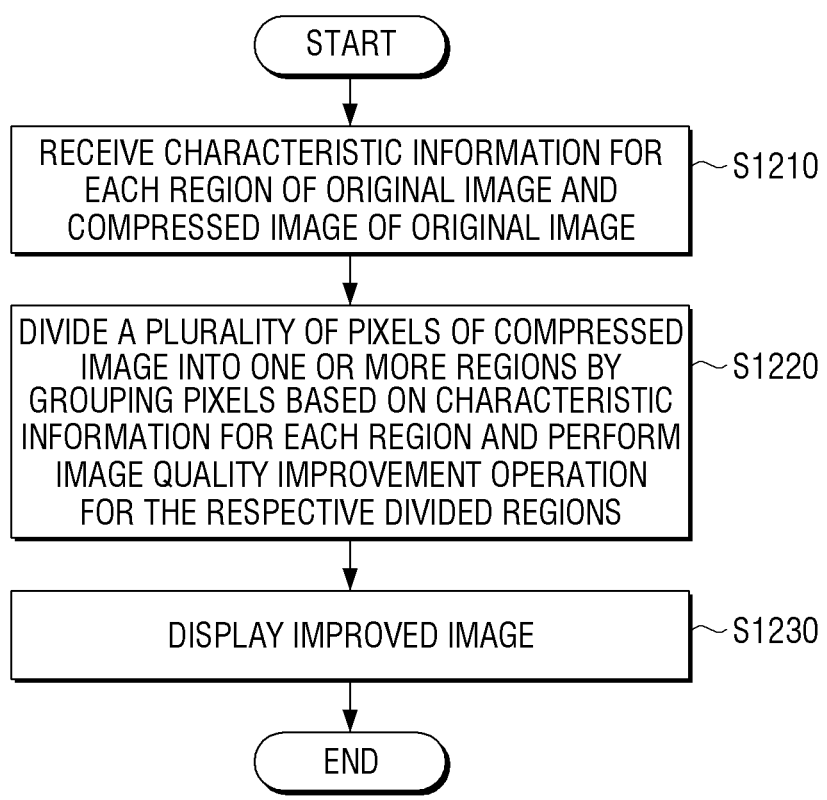
FIG. 12 is a flow chart provided to describe a method for controlling a display apparatus according to an embodiment disclosed herein.

FIG. 12 is a flow chart provided to describe a method for controlling a display apparatus according to an embodiment disclosed herein.

Referring to the method of FIG. 12, characteristic information for each region of an original image and a compressed image of the original image may be received (S1210).

Subsequently, a plurality of pixels of the compressed image may be divided into one or more regions by being grouped based on the characteristic information for each region, and the image quality improvement operation may be performed for the respective divided regions (S1220).

In this case, the characteristic information for each region may include at least one of division information for each region for determining the respective divided regions of the original image, image quality information for each region on an image quality characteristic of the respective regions of the original image, boundary information for each region on distortion of image quality occurring at a boundary of the respective regions of the original image, intention information for each region on a predetermined image quality characteristic of the respective regions of the original image, and semantic information for each region for perceiving the respective regions of the original image.

The performing the image quality improvement operation may include determining to which region the respective pixels of the compressed image belong based on the division information for each region and performing the image quality improvement operation for the respective regions of the compressed image based on at least one of the image quality information for each region, the boundary information for each region, the intention information for each region, and the semantic information for each region.

Subsequently, the improved image may be displayed (S1230).

Meanwhile, a non-transitory computer readable medium including a program for sequentially executing the method may be provided.

As an example, a non-transitory computer readable medium, including a program for performing the operations of generating a compressed image by image-processing an original image, dividing the original image into one or more regions based on the image quality characteristic, and obtaining characteristic information for each region from the respective regions, may be provided.

As another example, a non-transitory computer readable medium, including a program for performing the operations of dividing a plurality of pixels of a compressed image into one ore more regions by grouping the pixels based on the characteristic information for each region, performing the image quality improvement operation for the respective divided regions, and displaying the improved image, may be provided.

The non-transitory computer readable medium refers to a machine-readable medium that stores data permanently or semi-permanently unlike a register, a cache, or a memory that stores data for a short time. Particularly, the above-described various applications and programs may be stored in and provided through the non-transitory computer readable medium, such as, a Compact Disc (CD), a Digital Versatile Disk (DVD), a hard disk, a Blu-ray disk, a Universal Serial Bus (USB), a memory card, a Read-Only Memory (ROM), or the like.

In addition, the above block diagrams illustrating the content providing apparatus and the display apparatus do not include bus, but communication of the components of the content providing apparatus and the display apparatus may be performed through the bus. Further, each apparatus may further include a processor for performing the above-described various operations, for example, a Central Processing Unit (CPU), a microprocessor, or the like.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to a person having ordinary skill in the art.

What is claimed is:

1. A content providing apparatus comprising:
communication circuitry configured to communicate with an external apparatus;
an image processor; and
a processor configured to:
control the image processor to obtain a compressed image by compressing an original image;
divide a plurality of pixels of the original image into a plurality of first regions based on an image quality characteristic of the original image;
obtain first characteristic information for each first region from the plurality of first regions;
divide a plurality of pixels of the compressed image into a plurality of second regions corresponding to the first regions of the original image;
obtain second characteristic information for each second region from the plurality of second regions; and
control the communication circuitry to transmit the first characteristic information, the second characteristic information, and the compressed image to the external apparatus for use by the external apparatus in image quality improvement processing,
wherein the first characteristic information comprises division information for each of the first regions, image quality information for each of the first regions, boundary information for each of the first regions, and intention information for each of the first regions, and
wherein the division information for each of the first regions comprising a color value and a color variance for the respective first region.

2. The content providing apparatus as claimed in claim 1, wherein the division information for each first region comprises information on a first region to which the respective pixels of the original image belong among the respective divided regions,
wherein the information on the first region to which the respective pixels of the original image belong comprises at least one of information on a characteristic parameter for each first region and information on a pixel coordinate of the respective first regions.

3. The content providing apparatus as claimed in claim 1, wherein the processor is configured to generate and transmit synchronization information for synchronization of the compressed image and the characteristic information for each second region.

4. A display apparatus comprising:
a display;
a receiver configured to receive a compressed image obtained by compressing an original image, first characteristic information for each of a plurality of first regions into which a plurality of pixels of the original image is divided, and second characteristic information for each of a plurality of second regions into which a plurality of pixels of the compressed image is divided, the first characteristic information comprises division information for each of the first regions, image quality information for each of the first regions, boundary information for each of the first regions, and intention information for each of the first regions, and
wherein the division information for each of the first regions comprising a color value and a color variance for the respective first region; and
a processor configured to:
based on the first and second characteristic information, divide a plurality of pixels of the received compressed image into the plurality of second regions and perform an image quality improvement operation for the compressed image, and
control the display to display an improved image obtained by the image quality improvement operation.

5. The display apparatus as claimed in claim 4, wherein the processor is configured to determine to which second region the plurality of respective pixels of the compressed image belong based on division information for the second regions and perform the image quality improvement operation for respective second regions of the compressed image based on at least one of image quality information for each second region and boundary information for each second region.

6. The display apparatus as claimed in claim 4, wherein the receiver is configured to receive synchronization information for synchronization of the compressed image and the second characteristic information for each second region,
wherein the processor is configured to perform synchronization of the compressed image and the second characteristic information for each second region based on the synchronization information and perform the image quality improvement operation for the compressed image based on the second characteristic information for each second region.

7. A method for controlling a content providing apparatus, the method comprising:
obtaining a compressed image by compressing an input original image;
dividing a plurality of pixels of the original image into a plurality of first regions based on an image quality characteristic of the original image;
obtaining first characteristic information for each first region from the plurality of first regions;
dividing a plurality of pixels of the compressed image into a plurality of second regions corresponding to the first regions of the original image;
obtaining second characteristic information for each second region from the plurality of second regions; and
transmitting the first characteristic information, the second characteristic information, and the compressed image to the external apparatus, wherein
the first characteristic information comprises division information for each of the first regions, image quality information for each of the first regions, boundary information for each of the first regions, and intention information for each of the first regions, and
wherein the division information for each of the first regions comprising a color value and a color variance for the respective first region.

8. A method for controlling a display apparatus, the method comprising:
receiving a compressed image obtained by compressing an original image, first characteristic information for each of a plurality of first regions into which a plurality of pixels of the original image is divided, and second characteristic information for each of a plurality of second regions into which a plurality of pixels of the compressed image is divided;
based on the first and second characteristic information, dividing a plurality of pixels of the received compressed image into the plurality of second regions and performing an image quality improvement operation for the compressed image; and
displaying an improved image obtained by the image quality improvement operation, wherein
the first characteristic information comprises division information for each of the first regions, image quality information for each of the first regions, boundary information for each of the first regions, and intention information for each of the first regions, and
wherein the division information for each of the first regions comprising a color value and a color variance for the respective first region.

9. The content providing apparatus as claimed in claim 1, wherein the color value comprises color centroid value.

10. The display apparatus as claimed in claim 4, wherein the color value comprises color centroid value.

11. The method as claimed in claim 7, wherein the color value comprises a color centroid value.

12. The method as claimed in claim 8, wherein the color value comprises a color centroid value.

* * * * *